United States Patent
Igarashi

(10) Patent No.: US 10,595,605 B2
(45) Date of Patent: Mar. 24, 2020

(54) CARD-ACCOMMODATING BACK COVER

(71) Applicant: POWER SUPPORT CO.,LTD., Tokyo (JP)

(72) Inventor: Katsushi Igarashi, Tokyo (JP)

(73) Assignee: POWER SUPPORT CO., LTD., Tokyo (JP)

( * ) Notice: Subject to any disclaimer, the term of this patent is extended or adjusted under 35 U.S.C. 154(b) by 0 days.

(21) Appl. No.: 15/576,745

(22) PCT Filed: Jul. 8, 2016

(86) PCT No.: PCT/JP2016/070310
§ 371 (c)(1),
(2) Date: Nov. 24, 2017

(87) PCT Pub. No.: WO2017/007028
PCT Pub. Date: Jan. 12, 2017

(65) Prior Publication Data
US 2019/0000201 A1 Jan. 3, 2019

(30) Foreign Application Priority Data
Jul. 8, 2015 (JP) .................... 2015-137294

(51) Int. Cl.
A45C 11/18 (2006.01)
H04M 1/18 (2006.01)
(Continued)

(52) U.S. Cl.
CPC .......... *A45C 11/182* (2013.01); *H04B 1/3888* (2013.01); *H04M 1/185* (2013.01);
(Continued)

(58) Field of Classification Search
CPC ............ A45C 11/182; A45C 2011/188; H04B 1/3888; H04M 1/02; H04M 1/11; H04M 1/21; H04M 1/185
(Continued)

(56) References Cited

U.S. PATENT DOCUMENTS 4,170,914 A 10/1979 Carrier
D256,852 S 9/1980 McGahee
(Continued)

FOREIGN PATENT DOCUMENTS

CN 202566756 U 12/2012
CN 202696670 U 1/2013
(Continued)

OTHER PUBLICATIONS

International Search Report dated Nov. 15, 2016 of corresponding International application No. PCT/JP2016/070310; 2 pgs.
(Continued)

*Primary Examiner* — Rafael A Ortiz
(74) *Attorney, Agent, or Firm* — Maier & Maier, PLLC

(57) ABSTRACT

[Problem] Provided is a card-containing back cover that has excellent strength and appearance and that a card can be easily inserted into and removed from.
[Solving Means] A card-containing back cover configured to be mounted on a back face of a mobile information terminal includes a cover body configured to be mounted on the mobile information terminal and a card-containing pocket disposed on an outer surface of the cover body and configured to be capable of containing a card by sliding the card. A card removal hole is provided in the cover body at a position covered by the card-containing pocket, and the card removal hole is formed such that the card contained in the card-containing pocket can be slid through the card removal hole and removed from the card-containing pocket.

7 Claims, 5 Drawing Sheets

(51) Int. Cl.
*A45C 11/00* (2006.01)
*H04B 1/3888* (2015.01)
*H04M 1/21* (2006.01)

(52) U.S. Cl.
CPC ... *A45C 2011/002* (2013.01); *A45C 2011/003* (2013.01); *H04M 1/21* (2013.01)

(58) Field of Classification Search
USPC .................................. 206/320, 724, 725, 39
See application file for complete search history.

(56) References Cited

U.S. PATENT DOCUMENTS

| | | |
|---|---|---|
| D314,865 S | 2/1991 | Tuisku |
| D431,719 S | 10/2000 | Mucarquer |
| 6,155,410 A | 12/2000 | Davis |
| 6,845,863 B1 * | 1/2005 | Riley ................... A45C 11/182 |
| | | 150/147 |
| D541,964 S | 5/2007 | Tseng |
| D575,506 S | 8/2008 | Huang |
| D606,308 S | 12/2009 | Cheng-Wei |
| D615,078 S | 5/2010 | Bradley |
| D619,805 S | 7/2010 | Leung |
| D620,931 S | 8/2010 | Opman |
| D625,303 S | 10/2010 | Kim |
| D637,232 S | 5/2011 | Ringl |
| D637,648 S | 5/2011 | Ringl |
| D649,539 S | 11/2011 | Hong |
| D653,851 S | 2/2012 | Flyvholm |
| D678,871 S | 3/2013 | Mishan et al. |
| D681,620 S | 5/2013 | Huskinson |
| D688,655 S | 8/2013 | Rey-Hipolito et al. |
| D703,651 S | 4/2014 | Ehrlich |
| D709,059 S | 7/2014 | Kim et al. |
| D709,061 S | 7/2014 | Borra et al. |
| D718,289 S | 11/2014 | Brand |
| D723,535 S | 3/2015 | Minn et al. |
| 9,004,275 B2 * | 4/2015 | Lee ........................ A45C 11/00 |
| | | 206/320 |
| D741,335 S | 10/2015 | Bastian et al. |
| D743,388 S | 11/2015 | Fitzpatrick et al. |
| D750,056 S | 2/2016 | Lee |
| D753,099 S | 4/2016 | Kim |
| D755,168 S | 5/2016 | Kim |
| D756,977 S | 5/2016 | Schriefer et al. |
| D761,774 S | 7/2016 | Liang |
| D764,476 S | 8/2016 | Gleason, III et al. |
| 2002/0117243 A1 | 8/2002 | Koren |
| 2004/0226836 A1 * | 11/2004 | Schreiber ................ A45F 5/02 |
| | | 206/305 |
| 2007/0057004 A1 * | 3/2007 | Butler .................. A45C 11/182 |
| | | 224/669 |
| 2010/0224519 A1 | 9/2010 | Kao |
| 2010/0230301 A1 * | 9/2010 | Fellig ................... H04B 1/3888 |
| | | 206/232 |
| 2011/0294556 A1 * | 12/2011 | Carlberg ................ A45C 11/00 |
| | | 455/575.8 |
| 2013/0273944 A1 | 10/2013 | Wilson et al. |
| 2015/0076020 A1 * | 3/2015 | Smith .................... A45C 11/00 |
| | | 206/320 |

FOREIGN PATENT DOCUMENTS

| | | |
|---|---|---|
| CN | 103268512 B | 8/2013 |
| CN | 103399619 A | 11/2013 |
| JP | 2013-9277 A | 1/2013 |
| JP | 2014-117483 A | 6/2014 |
| JP | 2014117483 A * | 6/2014 |
| JP | 2014117483 A | 6/2014 |
| JP | 2015-106754 A | 6/2015 |

OTHER PUBLICATIONS

U.S. Office Action dated Jul. 5, 2018, in connection with corresponding U.S. Appl. No. 29/550,835 (17 pgs.).

Chinese Office Action dated Nov. 4, 2019, in connection with corresponding Chinese Application No. 201680038669.7 (12 pgs.).

* cited by examiner

CARD-ACCOMMODATING BACK COVER

TECHNICAL FIELD

The present invention relates to a card-containing back cover that is configured to be mounted on the back face of a mobile information terminal and can contain a card.

BACKGROUND ART

Mobile information terminals, including smartphones and tablet terminals, are commercially available from various companies, can be intuitively operated through a touchscreen, and are being used by many users due to the high portability thereof.

Many users carry a mobile information terminal in a pocket or bag, and such a mobile information terminal is more likely to be damaged. For this reason, back covers configured to be mounted on the back face of a mobile information terminal are being widely used.

Among these back covers are ones that can contain an IC card. Conveniently, a payment can be made by containing an IC card in a back cover and then simply bringing a mobile information terminal having the back cover mounted thereon close to an IC card reader.

Patent Literature 1 discloses various methods for containing an IC card. FIG. 5 of Patent Literature 1 discloses a configuration in which an electromagnetic wave intercepting sheet and an IC card are contained between a mobile information terminal and a back cover. FIG. 6 of Patent Literature 1 discloses a configuration in which an IC card is contained in a pocket disposed on the outer surface of a back cover. FIGS. 4, 7 of Patent Literature 1 disclose configurations in which a card container is disposed between two plates and an IC card can be inserted into and removed from the card container by sliding one plate.

CITATION LIST

Patent Literature

[Patent Literature 1] Japanese Unexamined Patent Application Publication No. 2015-106754

SUMMARY OF INVENTION

Technical Problem

In the configuration of FIG. 5 of Patent Literature 1, the IC card or electromagnetic wave intercepting sheet is not fixed to the cover and therefore may fall when the IC card is inserted or removed. In the configuration of FIG. 6 of Patent Literature 1, the IC card is exposed through an opening formed in the pocket and thus the appearance of the back cover may be degraded. The configurations of FIGS. 4, 7 of Patent Literature 1 require a mechanism for sliding the plate and therefore are more likely to lack strength and durability.

The present invention has been made in view of the foregoing, and an object thereof is to provide a card-containing back cover that has excellent strength and appearance and that a card can be easily inserted into and removed from.

Solution to Problem

The present invention provides a card-containing back cover configured to be mounted on a back face of a mobile information terminal. The back cover includes a cover body configured to be mounted on the mobile information terminal and a card-containing pocket disposed on an outer surface of the cover body and configured to be capable of containing a card by sliding the card. A card removal hole is provided in the cover body at a position covered by the card-containing pocket, and the card removal hole is formed such that the card contained in the card-containing pocket can be slid through the card removal hole and removed from the card-containing pocket.

In the configuration of the present invention, the card is contained in the card-containing pocket by sliding the card from the outside of the cover body. Thus, the card can be contained in the card-containing pocket without having to detach the cover body from the mobile information terminal. Also, the card can be removed from the card-containing pocket by pressing a finger or the like against the card through the card removal hole and sliding the card with the cover body detached from the mobile information terminal. Since the card is disposed in the card-containing pocket, it does not fall even if the cover body is detached from the mobile information terminal. Also, the card is slid through the card removal hole and therefore need not be exposed to the outside of the card-containing pocket. Thus, the degradation of the appearance caused by the exposure of the card can be avoided. Further, if an electromagnetic wave intercepting sheet is used, it can be fixed to the cover body. Thus, when the card is inserted or removed, the fall of the electromagnetic wave intercepting sheet can be prevented. Furthermore, the back cover of the present invention does not require a mechanism for sliding a plate and therefore has excellent strength and durability.

Various embodiments of the present invention are described below. The embodiments below can be combined with each other.

Preferably, the cover body is provided with an electromagnetic wave intercepting sheet capable of intercepting an electromagnetic wave from the mobile information terminal, in a position corresponding to the card-containing pocket.

Preferably, the card includes an antenna incorporated in a periphery thereof, and the card removal hole is formed in a position that is not overlaid on the antenna with the card contained in the card-containing pocket.

BRIEF DESCRIPTION OF THE DRAWINGS

FIGS. 5A, 5B are drawings showing the positional relationship between the card 7 and an electromagnetic wave intercepting sheet 2c, in which FIG. 5A is a perspective view; and FIG. 5B is a view seen from the card 7.

DETAILED DESCRIPTION

Now, an embodiment of the present invention will be described with reference to FIGS. 1 to 5. Various features described in the embodiment below can be combined with each other. Inventions are established for the respective features.

Figure 1:
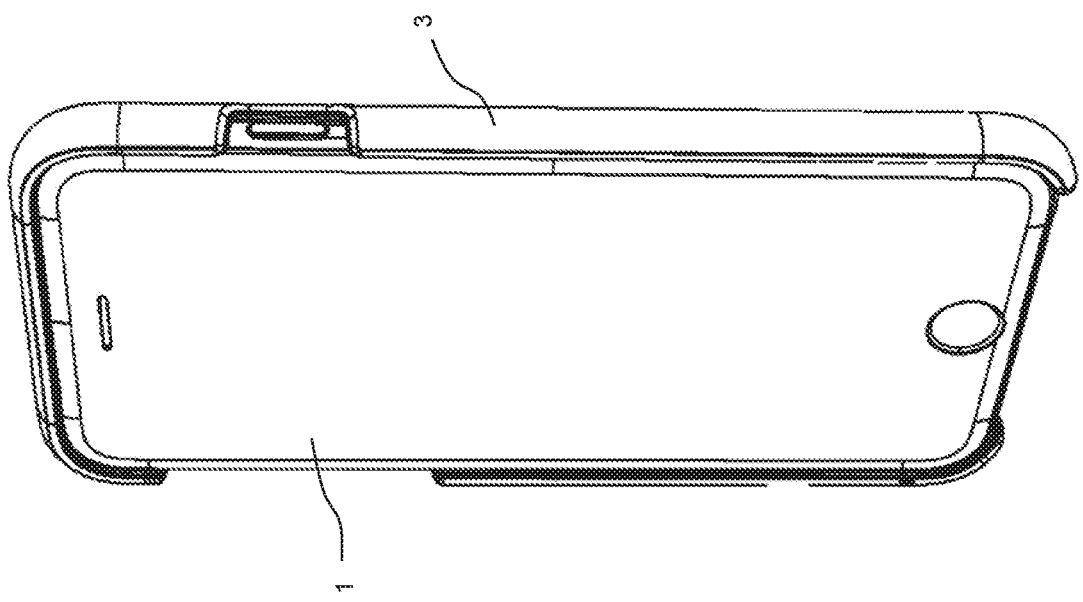
FIG. 1 is a perspective view showing a state in which a card-containing back cover 3 is mounted on the back face of a mobile information terminal 1.
Figure 2B:
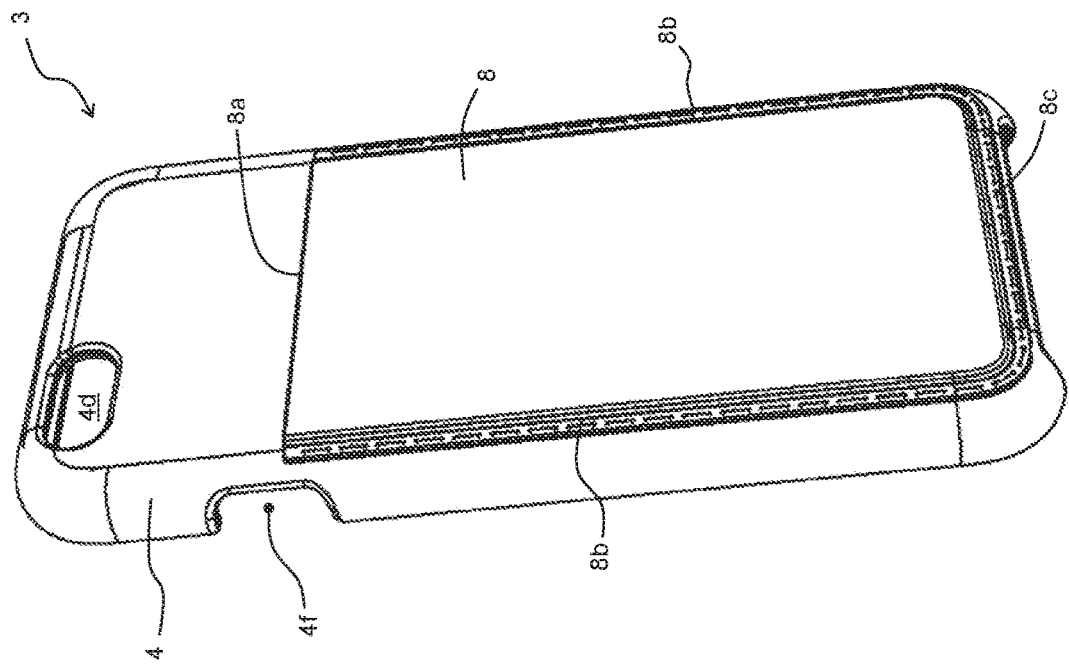
FIGS. 2A, 2B are perspective views of the back cover 3.
Figure 2A:
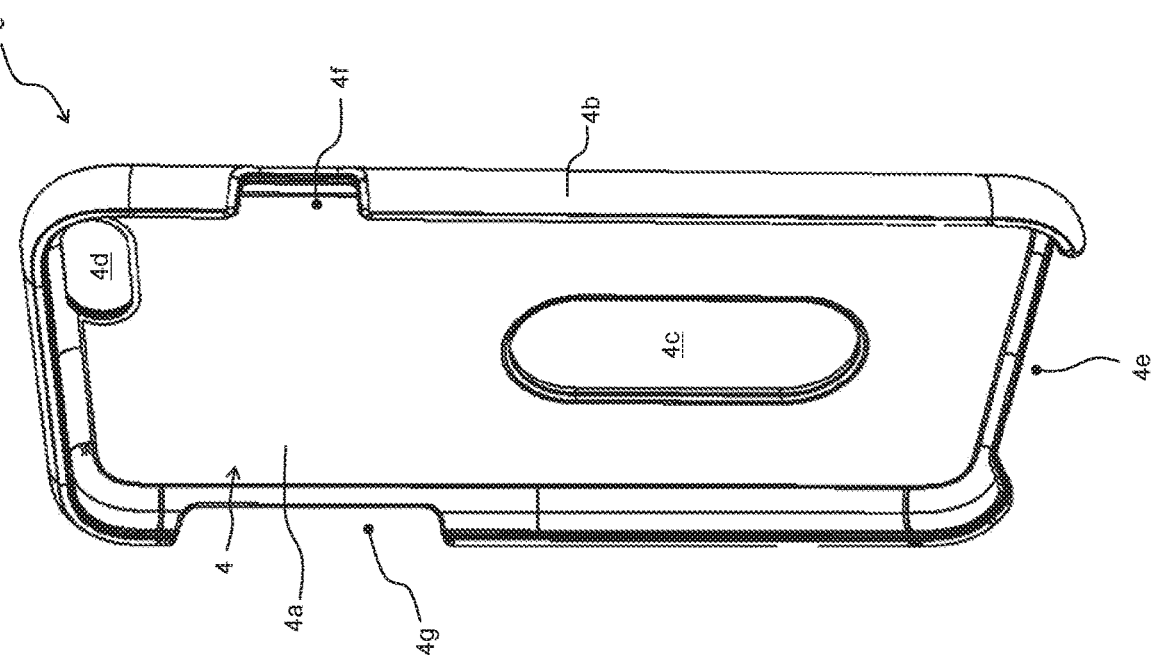

FIG. 1 shows a state in which a card-containing back cover 3 is mounted on the back face of a mobile information terminal 1. For example, the mobile information terminal 1 is iPhone 6. The back cover 3 is mounted on the mobile information terminal 1 so as to cover the back and side faces of the mobile information terminal 1. As shown in FIGS. 2A, 2B, the back cover 3 includes a cover body 4 and a card-containing pocket 8 disposed on the outer surface of the cover body 4.

The cover body 4 includes a back covering part 4a for covering the back face of the mobile information terminal 1 and a side covering part 4b for covering the sides of the mobile information terminal 1. The back cover 3 is mounted on the mobile information terminal 1 by elastically engaging the side covering part 4b with the mobile information terminal 1. The back covering part 4a has a card removal hole 4c and a camera opening 4d. The card removal hole 4c will be described later. The camera opening 4d is formed in a position corresponding to a camera and a flashlight disposed in the mobile information terminal 1. The side covering part 4b has notches 4e, 4f, 4g in positions corresponding to an operation switch and a connector disposed on the sides of the mobile information terminal 1.

Figure 3:
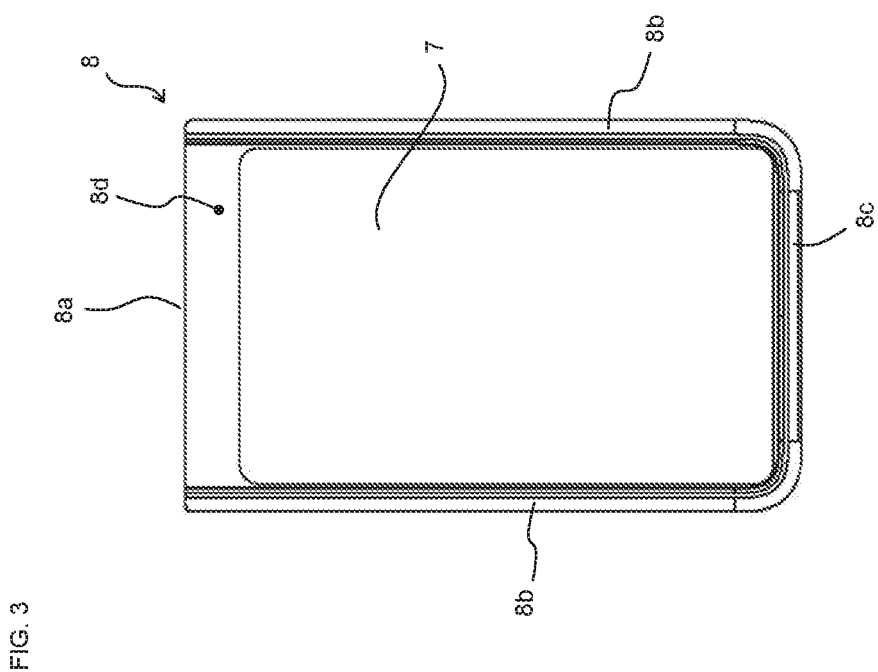
FIG. 3 is a drawing showing a state in which a card 7 is contained in a card-containing pocket 8, seen from a cover body 4.

The card-containing pocket 8 is approximately rectangular and has an open upper end 8a, and closed side ends 8b and lower end 8c. As shown in FIG. 3, the card-containing pocket 8 is configured such that a card 7 inserted from the upper end 8a can be held in the space 8d between the card-containing pocket 8 and cover body 4. Since the sizes of the space 8d in the width and height directions are greater than those of the card 7, the entire card 7 is held in the space 8d. Also, the card-containing pocket 8 has no hole or notch. Accordingly, when the card 7 is held in the space 8d, it cannot be seen from outside, meaning that the appearance of the card-containing pocket 8 is not degraded. Also, the card 7 can be removed from the card-containing pocket 8 by sliding the card 7 through the card removal hole 4c using a finger or the like. The shape of the card removal hole 4c may be any shape, but is preferably elongated (e.g., oval) in the sliding direction of the card 7 so that the card 7 is easily slid. The card removal hole 4c is formed so as to be located in the approximate center of the card 7 with the card 7 disposed in the card-containing pocket 8.

Figure 4:
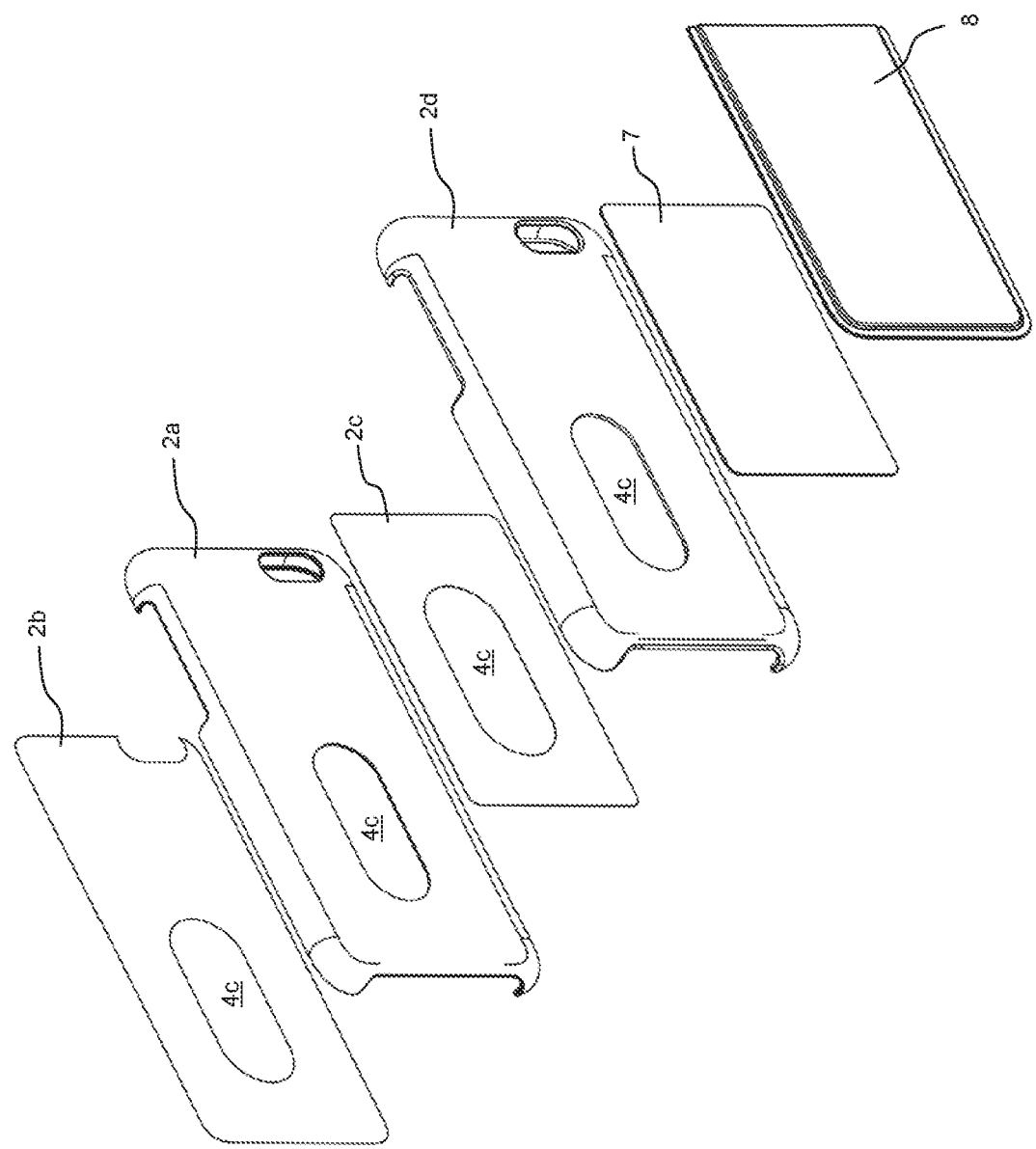
FIG. 4 is an exploded perspective view of the back cover 3.

As shown in FIG. 4, the cover body 4 includes a body 2a, an inner cover 2b pasted to the inside of the body 2a, an electromagnetic wave intercepting sheet 2c pasted to the outside of the body 2a, and an outer cover 2d pasted to the outside the body 2a so as to cover the electromagnetic wave intercepting sheet 2c. The body 2a is formed of a resin, and the inner cover 2b and outer cover 2d are formed of a material having a good appearance, such as leather. Since the inner cover 2b and outer cover 2d are disposed in order to improve the appearance of the cover body 4, they may be omitted in terms of function.

The electromagnetic wave intercepting sheet 2c is formed of a material capable of absorbing an electromagnetic wave, such as ferrite. If the card 7 is a non-contact IC card, the electromagnetic wave intercepting sheet 2c prevents the card 7 from malfunctioning due to an electromagnetic wave from the back face of the mobile information terminal 1. On the other hand, if the card 7 is insusceptible to an electromagnetic wave, the electromagnetic wave intercepting sheet 2c may be omitted.

Figure 5B:
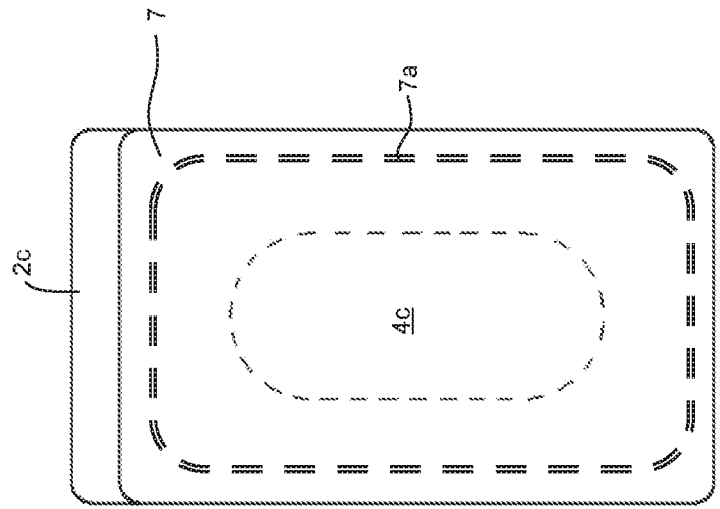
Figure 5A:
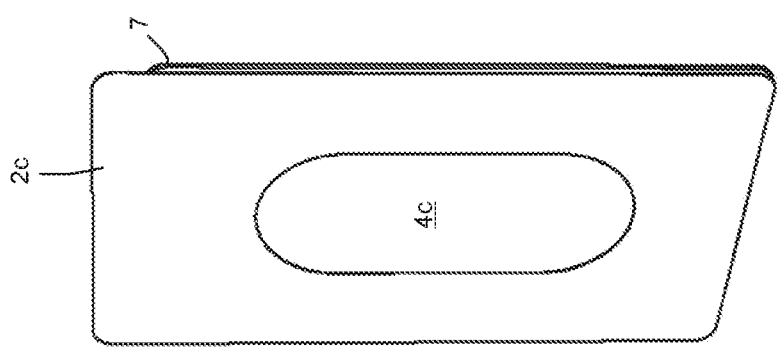

As shown in FIG. 5, the electromagnetic wave intercepting sheet 2c is disposed so as to be overlaid on the card 7 contained in the card-containing pocket 8. Note that the electromagnetic wave intercepting sheet 2c has an opening in an area corresponding to the card removal hole 4c and does not intercept an electromagnetic wave from the mobile information terminal 1 in this opening. However, this area is not an area corresponding to any antenna 7a embedded in the card 7 and therefore the card 7 does not malfunction even if an opening is formed in this area. Conventionally, the formation of an opening in the electromagnetic wave intercepting sheet 2c is avoided so that the electromagnetic wave intercepting sheet 2c produces a sufficient electromagnetic wave interception effect. On the other hand, the present inventor has noted that any antenna 7a is not disposed in the approximate center of the card 7. The present inventor has then permitted the formation of an opening in a position of the electromagnetic wave intercepting sheet 2c corresponding to the approximate center of the card 7, thereby allowing for the formation of the card removal hole 4c in the cover body 4.

The present invention may be carried out in the following aspect. The electromagnetic wave intercepting sheet 2c only has to be disposed between the mobile information terminal 1 and card 7 and may be pasted to the outside of the outer cover 2d or to the inside of the body 2a or inner cover 2b.

DESCRIPTION OF REFERENCE SIGNS

1: mobile information terminal, 2a: body, 2b: inner cover, 2c: electromagnetic wave intercepting sheet, 2d: outer cover, 3: card-containing back cover, 4: cover body, 4c: card removal hole, 7: card, 8: card-containing pocket

The invention claimed is:

1. A card-containing back cover configured to be mounted on a back face of a mobile information terminal, comprising:
    a cover body and a card-containing pocket which are separated formed,
        the cover body configured to be mounted on the mobile information terminal; and
        the card-containing pocket disposed on attached directly to an outer surface of the cover body, and configured to be capable of containing a card by sliding the card, wherein
    the card-containing pocket includes a close end and an open end,
        the close end is provided on a side of one end in a longitudinal direction of the cover body, and
        the open end is provided between the one end and the other end in the longitudinal direction of the cover body,
    a card removal hole is provided in the cover body at a position covered by the card-containing pocket, and
    the card removal hole is formed such that the card contained in the card-containing pocket can be slid through the card removal hole and removed from the card-containing pocket,
    width of the cover body in a short direction of the cover body is wider than width of the card-containing pocket in the short direction of the card-containing pocket, the short direction of the cover body being parallel to the short direction of the card-containing pocket.

2. The back cover of claim 1, wherein the cover body is provided with an electromagnetic wave intercepting sheet capable of intercepting an electromagnetic wave from the mobile information terminal, in a position corresponding to the card-containing pocket.

3. The back cover of claim 1, wherein
    the card comprises an antenna incorporated in a periphery thereof, and the card removal hole is formed in a position that is not overlaid on an antenna of the card with the card contained in the card-containing pocket.

4. The back cover of claim 1, wherein
the cover body includes a body and an outer cover,
the outer cover has a shape corresponding to a shape of the body of the cover body,
the card-containing pocket is attached to an outer surface of the outer cover.

5. The back cover of claim 4, wherein
the cover body includes an electromagnetic wave intercepting sheet,
the electromagnetic wave intercepting sheet is provided so as to face the card-containing pocket via the outer cover,
the electromagnetic wave intercepting sheet is configured to intercept an electromagnetic wave from the mobile information terminal,
the electromagnetic wave intercepting sheet is provided between the body of the cover body and the outer cover of the cover body.

6. The back cover of claim 5, wherein
the card removal hole penetrates the body of the cover body, the electromagnetic wave intercepting sheet and the outer cover.

7. A card-containing back cover configured to be mounted on a back face of a mobile information terminal, comprising:
a cover body and a card-containing pocket which are separated formed,
the cover body configured to be mounted on the mobile information terminal; and
the card-containing pocket attached to an outer surface of the cover body, and configured to be capable of containing a card by sliding the card, wherein
the card-containing pocket includes a close end and an open end,
the close end is provided on a side of one end in a longitudinal direction of the cover body, and
the open end is provided between the one end and the other end in the longitudinal direction of the cover body,
a card removal hole is provided in the cover body at a position covered by the card-containing pocket, and
the card removal hole is formed such that the card contained in the card-containing pocket can be slid through the card removal hole and removed from the card-containing pocket,
wherein
the cover body includes a body, an outer cover, and an electromagnetic wave intercepting sheet,
the outer cover has a shape corresponding to a shape of the body of the cover body,
the card-containing pocket is attached to an outer surface of the outer cover,
the electromagnetic wave intercepting sheet is provided so as to face the card-containing pocket via the outer cover,
the electromagnetic wave intercepting sheet is configured to intercept an electromagnetic wave from the mobile information terminal,
the electromagnetic wave intercepting sheet is provided between the body of the cover body and the outer cover of the cover body,
the card removal hole penetrates the body of the cover body, the electromagnetic wave intercepting sheet and the outer cover.

\* \* \* \* \*